United States Patent Office 3,044,999
Patented July 17, 1962

3,044,999
(2,2-DIHALOCYCLOPROPYL) STYRENES
William F. Tousignant, Midland, Mich., assignor to The Dow Chemical Company, Midland, Mich., a corporation of Delaware
No Drawing. Filed Sept. 29, 1960, Ser. No. 59,173
19 Claims. (Cl. 260—91.5)

This invention relates to a new class of halogen-containing vinyl aromatic compounds, to a process for preparing them, and to polymers and copolymers prepared from them. More particularly, it is concerned with (2,2-dihalocyclopropyl) styrenes and substituted derivatives thereof, their polymers and copolymers, and with a process for making these new compounds.

These compounds have the general structural formula:

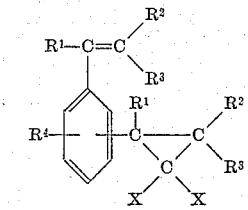

wherein X is halogen; $R^1$, $R^2$, and $R^3$ are individually selected from the group consisting of hydrogen, lower alkyl groups containing 1–4 carbon atoms, and cyclohexyl; and $R^4$ is selected from the group consisting of hydrogen, lower alkyl groups containing 1–4 carbon atoms, cyclohexyl, phenyl, and halogen. The two functional groups in the molecule, that is, the dihalocyclopropyl and the vinyl groups, may be in any of the three possible positions on the ring relative to each other, ortho, meta, or para.

These compounds constitute a new class of substituted styrene monomers which are useful in that they can be polymerized, or copolymerized with other suitable monomers, to make resins having fire-retardant and self-extinguishing properties. Polymeric resins, and particularly, polystyrene and polystyrene-containing resins, are commonly made fire-retardant or self-extinguishing by combining them with organic or inorganic additives. Known additives used for the purpose include inorganic carbonates, polyhalogenated organic phosphates, and antimony oxide. While these are effective for the purpose, they suffer from certain disadvantages in many applications. Thus, being additives physically incorporated in a plastic body, they may partially separate from the plastic or be leached from it, they may cause discoloration or opacity, and very often they may weaken the useful properties of the plastic by their presence.

Therefore, these new halogenated monomers are particularly valuable, since they offer a means whereby a resin may be formed which has the desired fire-retardant and self-extinguishing properties chemically bound within the molecule. The terms fire-retardant and self-extinguishing as used here mean resistant to combustion, and incapable of supporting combustion by itself, respectively. Monomers which may be copolymerized with my new halogenated monomer to make such self-extinguishing resins include styrene, derivatives of styrene such as α-methyl styrene, vinyltoluene, and halogenated styrenes, acrylates and methacrylates, butadiene, and substantially any other vinyl substituted compounds known to be copolymerizable with styrene.

These new halogenated monomers are advantageously used not only to make fire-retardant and self-extinguishing resins, but also may be used with other monomers to make resins having improved properties such as higher heat distortion temperatures, higher softening points, improved hardness, and the like.

These (2,2-dihalocyclopropyl) styrenes have utilities other than as a monomer and among these may be mentioned their use as chemical intermediates. Because these compounds possess not only the reactive vinyl group, but also the dihalogenated cyclopropyl group whose halogens may be used as a point of attack, a wide variety of possible derivatives is readily apparent.

(2,2-dihalocyclopropyl) styrenes are readily prepared by the reaction of a divinylbenzene with an alkali metal alkoxide and a trihalomethane, all of these in approximately equimolecular proportions. The reaction is carried out at a relatively low temperature, from about −10° C. to about 50° C. being a suitable range, and preferably in the presence of a solvent unreactive in the process. With divinylbenzene itself, for example, the reaction proceeds as shown by the following equation:

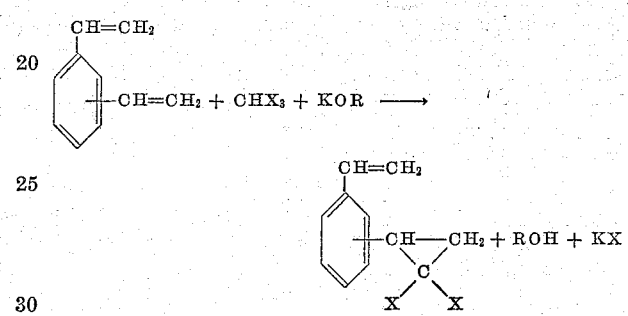

wherein R is lower alkyl and X is halogen. The divinylbenzenes used in this process are ordinarily made by catalytic dehydrogenation of the corresponding dialkylbenzenes.

In practice, I prefer to use an excess of the divinylbenzene in order to minimize the formation of the dicyclopropyl product. I have found that about 1.25–2.0 mols of the divinylbenzene per mol each of the other two reactants is suitable for this purpose.

The alkali metal alkoxide is preferably sodium or potassium tert-butoxide. This reactant may advantageously be prepared just prior to use by the reaction of sodium or potassium metal with tert-butyl alcohol to avoid the pick-up of any moisture. Other suitable alkoxides are sodium or potassium methoxide, ethoxide, and isopropoxide.

The temperature most suitable for the process is in the approximate range of −10° C. to about 50° C. depending upon the reactants used. For example, when sodium tert-butoxide is used, the preferred temperature is about 20–40° C. and when potassium tert-butoxide is used, a temperature of about −5° to 5° C. is preferred.

When a solvent is used as a reaction medium, it is suitably an unreactive material such as an aliphatic hydrocarbon. Pentane and hexane are satisfactory examples. The process may also be run using only an excess of the divinylbenzene as the solvent.

The time required for satisfactory completion of the reaction is fairly substantial. From four to eight hours is operable but a total reaction time of about 18–20 hours is preferred.

The crude product is separated from the reaction mixture by distillation or by steam distillation after appropriate extraction and washing steps. Details of the work-up procedure are given in the following examples.

*Example 1*

To a one l. vessel equipped with condenser, stirrer, thermometer, and source of heat was added 750 cc. tert-butyl alcohol which had been dried by distillation from sodium. To the boiling alcohol was added 0.7 g. mol of potassium metal in small pieces over a perior of 1 hour. When all the metal had reacted, the excess alcohol was removed under vacuum. The potassium tert-butoxide was cooled to room temperature, care being taken to exclude moisture, and 250 g. m-divinylbenzene-m-ethylstyrene mixture containing 55% (147.5 g.=1.5 g. mol) m-divinylbenzene was added. To this was added 250 cc. pentane as a solvent. The mixture was cooled to about −5° C. and stirred to form a well-dispersed slurry of potassium tert-butoxide in the above liquids. To this slurry at −5° to 3° C. was added dropwise 0.77 g. mol of chloroform over a period of 2 hours. The reaction mixture was then allowed to warm to room temperature and it was stirred for an additional 18 hours. To the now dark-colored solution was added 250 cc. water and a small amount of HCl to neutralize a slight excess basicity. The pentane layer was separated and the water layer was extracted once with 250 cc. pentane. The combined pentane layers were then dried, filtered, and distilled.

The fraction boiling at 90° C./0.2 mm. was collected. It amounted to 92.0 g. or 62% crude yield. It was re-fractionated to give 68.0 g., B. Pt. 75–80°/0.2 mm., representing 46% yield based upon the potassium used. The product was a colorless oil, soluble in organic solvents and insoluble in water, $d_4^{25}=1.1751$. By analysis of the vinyl group, it was 91.8% pure m-(2,2-dichlorocyclopropyl) styrene.

Example 2

In a manner similar to that of Example 1, 0.7 g. mol of sodium tert-butoxide was prepared and this was reacted with 1.5 g. mol of m-divinylbenzene and 0.7 g. mol of bromoform at a temperature of 35° C. for six hours. After the reaction mixture had been stirred an additional 18 hours at room temperature, 250 cc. water was added to the dark-colored solution and a small amount of HCl was added to neutralize a slight excess basicity. The pentane layer was separated and the water layer was extracted once with 250 cc. pentane. The combined pentane layers were then dried, filtered, and distilled. The fraction boiling at 110–115° C./0.4 mm. was collected. This amounted to 93.0 g. or 51% crude yield based upon the sodium and the bromoform used. Refractionation of the crude gave 45.0 g., B. Pt. 99° C./0.2 mm., representing a yield of 21%. The product was a yellowish oil, soluble in organic solvents, insoluble in water, $$d_4^{25}=1.5878$$

By analysis of the vinyl group it was 96.3% pure m-(2,2-dibromocyclopropyl) styrene.

Example 3

In the same way as described in Example 1, 0.7 g. mol of potassium tert-butoxide and 0.7 g. mol of bromoform were reacted with 1.4 g. mols m-diisopropenylbenzene. The work-up of the reaction mixture was the same as in Example 1 except that the product was separated by steam distillation of the combined pentane layers. The crude m-(2,2-dibromo-1-methylcyclopropyl)-α-methyl styrene so obtained amounted to 153 g. It was redistilled to give 133 g. of a yellowish oil, B. Pt. 113–118° C./0.2 mm., $n_D^{25}=1.5880$.

These new monomers may be polymerized or copolymerized with other suitable vinyl monomers by the application of heat or radiation or by the use of known styrene polymerization catalysts such as benzoyl peroxide and α,α′-azobis(isobutyronitrile). Examples of such vinyl monomers are styrene, alkylated styrenes such as vinyltoluene and α-methylstyrene, halogenated styrenes, acrylates, methacrylates, acrylic derivatives such as amides and nitriles, butadiene, isoprene, butylene, isobutylene, and innumerable other vinylated aliphatic, heterocyclic, and aromatic compounds which are copolymerizable with styrene. The polymers thus obtained have solubility properties similar to those of styrene polymers. For example, copolymers of (2,2-dihalocyclopropyl) styrene with styrene are soluble in methyl ethyl ketone, methylene chloride, and toluene, and they are insoluble in alcohols.

By preparing a series of copolymers of styrene with varying amounts of m-(2,2-dichlorocyclopropyl) styrene and m-(2,2-dibromocyclopropyl) styrene, it was determined that copolymers containing about 55–65% by weight of the chlorinated compound or about 3.5–5.0% by weight of the brominated compound are self-extinguishing. The colymerizations were carried out at 120° C. without a catalyst. The resulting copolymers were dissolved in methyl ethyl ketone, precipitated out of methanol, and dried. White, moldable solids were obtained with softening points in the range of 125–135° C. Halogen content was determined by Parr bomb analysis. The copolymers were tested for self-extinguishing properties by placing them in a Bunsen burner flame until they were burning well, then, removing them from the flame. A self-extinguishing resin would immediately stop burning at this point.

Example 4

A copolymer was prepared as described above from a monomer mixture containing 6.3 g. styrene and 0.7 g. m-(2,2-dibromocyclopropyl) styrene. The copolymer was a fluffy white solid which contained 2.7% bromine by Parr bomb analysis, corresponding to 5.1% by weight content of the dibrominated monomer. It had an average molecular weight of 400,000 as estimated by the viscosity of a 10% solution in toluene. It was immediately self-extinguishing upon removal from a Bunsen burner flame.

Example 5

A copolymer containing 88.1% by weight methyl methacrylate and 11.9% by weight m-(2,2-dibromocyclopropyl) styrene, as determined by bromine analysis, was obtained by copolymerizing a mixture of 5 parts by weight of methyl methacrylate and 4 parts by weight of m-(2,2-dibromocyclopropyl) styrene at 80° C. for 18 hours in the presence of 1% α,α′-azobis(isobutyronitrile) as catalyst. Upon separation of the copolymer as described above, a colorless, moldable resin was obtained with a softening point of about 165–168° C. This resin was immediately self-extinguishing upon removal from a Bunsen burner flame.

Example 6

A copolymer containing 11.6% by weight of maleic anhydride and 88.4% by weight of m-(2,2-dichlorocyclopropyl) styrene by chlorine analysis was obtained by copolymerizing a mixture of 1.0 part by weight of maleic anhydride and 2.9 parts by weight of m-(2,2-dichlorocyclopropyl) stryene as described in Example 5. A colorless, moldable resin having a softening point of about 145–150° C. was obtained. This resin was self-extinguishing.

Example 7

By the procedure described in Examples 5 and 6, a copolymer containing 72.1% by weight of m-(2,2-dichlorocyclopropyl) styrene and 27.9% by weight of vinyl acetate was prepared. The product had a softening point of about 125° C. and it was a moldable and self-extinguishing resin.

Example 8

Several polymerizations of m-(2,2-dichlorocyclopropyl) styrene were carried out in sealed tubes at 120° C. for 48 hours, with and without polymerization catalysts. Self-extinguishing resins were obtained which had softening points in the range of 130–160° C. These homopolymers gave clear, hard resins when molded.

I claim:
1. (2,2-dihalocyclopropyl) styrenes of the general formula:

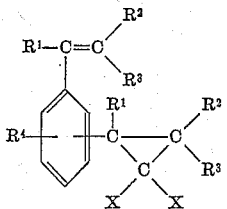

wherein X is halogen; $R^1$, $R^2$, and $R^3$ are individually selected from the group consisting of hydrogen, lower alkyl groups containing 1-4 carbon atoms, and cyclohexyl; and $R^4$ is selected from the group consisting of hydrogen, lower alkyl groups containing 1-4 carbon atoms, cyclohexyl, phenyl, and halogen.

2. The compounds as described in claim 1 wherein the 2,2-dihalocyclopropyl group is in the meta position on the benzene ring relative to the vinyl group.

3. Ar-(2,2-dihalocyclopropyl) styrene.

4. Ar-(2,2-dihalo - 1 - methylcyclopropyl)-α-methylstyrene.

5. m-(2,2-dichlorocyclopropyl) styrene.

6. m-(2,2-dibromocyclopropyl) styrene.

7. m-(2,2-dibromo - 1 - methylcyclopropyl)-α-methylstyrene.

8. A process for making the compounds as described in claim 1, which process comprises reacting one mol of a divinylbenzene of the general formula:

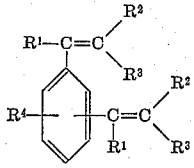

wherein $R^1$, $R^2$, and $R^3$ are individually selected from the group consisting of hydrogen, lower alkyl groups containing 1-4 carbon atoms, and cyclohexyl; and $R^4$ is selected from the groups containing 1-4 carbon atoms, cyclohexyl, phenyl, and halogen, with about 0.5-1.0 mol of an alkali metal alkoxide and about 0.5-1.0 mol of trihalomethane.

9. A process as described in claim 8 wherein the divinylbenzene is a meta-divinylbenzene.

10. A process for making m-(2,2-dibromocyclopropyl) styrene which comprises reacting 1 mol of m-divinylbenzene with about 0.5-1.0 mol of an alkali metal alkoxide and about 0.5-1.0 mol of tribromomethane.

11. A process for making m-(2,2-dibromo-1-methylcyclopropyl)-α-methylstyrene which comprises reacting 1 mol of m-diisopropenylbenzene with about 0.5-1.0 mol of an alkali metal alkoxide and about 0.5-1.0 mol of tribromomethane.

12. Homopolymers of the compounds as described in claim 1.

13. Homopolymers of m-(2,2-dichlorocyclopropyl) styrene.

14. Homopolymers of m-(2,2-dichloro-1-methylcyclopropyl)-α-methylstyrene.

15. Copolymers of compounds as described in claim 1 with vinyl monomers copolymerizable with styrene.

16. Copolymers of ar-(2,2-dihalocyclopropyl) styrene with vinyl monomers copolymerizable with styrene.

17. Copolymers of ar-(2,2-dihalo-1-methylcyclopropyl)-α-methylstyrene with vinyl monomers copolymerizable with styrene.

18. Copolymers of m-(2,2-dibromocyclopropyl) styrene with vinyl monomers of copolymerizable with styrene.

19. Copolymers of m-(2,2-dibromo - 1 - methylcyclopropyl)-α-methylstyrene with vinyl monomers copolymerizable with styrene.

References Cited in the file of this patent
UNITED STATES PATENTS
2,950,328   Orchin _____ Aug. 23, 1960